G. W. VOSBURGH.
Harness-Pads.

No. 154,303. Patented Aug. 18, 1874.

UNITED STATES PATENT OFFICE.

GEORGE W. VOSBURGH, OF EAU CLAIRE, WISCONSIN.

IMPROVEMENT IN HARNESS-PADS.

Specification forming part of Letters Patent No. 154,303, dated August 18, 1874; application filed August 5, 1874.

*To all whom it may concern:*

Be it known that I, GEORGE W. VOSBURGH, of Eau Claire, in the county of Eau Claire and in the State of Wisconsin, have invented a new and useful Improvement in Harness-Pads; and do hereby declare that the following is a full, clear, and exact description thereof, reference being had to the accompanying drawing, making a part of this specification, in which—

Figure 1:
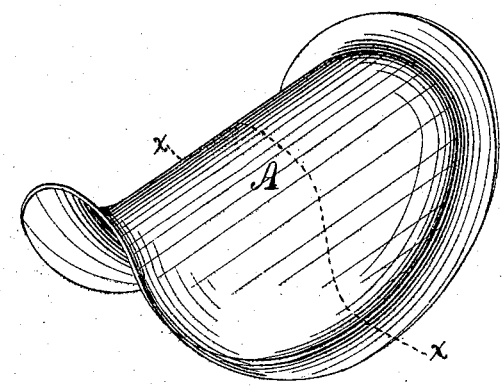
Figure 2:
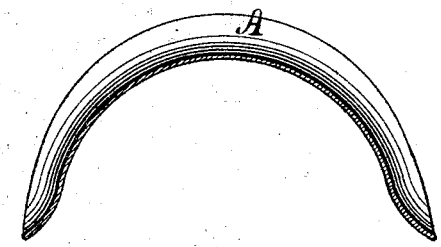

Figure 1 is a perspective view of a collar-pad constructed in accordance with my improved method, and Fig. 2 is a cross-section of the same.

Letters of like name and kind refer to like parts in each of the figures.

In the use of harness upon horses it is found that, at certain points where the pressure is greatest, the skin of the animal becomes abraded, and, if not promptly cared for, a sore is formed, which soon renders the animal unfit for use. To obviate this tendency to galling, many expedients have been employed, among which is the use of a lead lining to each of the pads that sustain the pressure of the harness, said metal being so soft as to prevent injury to the skin of the animal, and, in addition, being possessed of curative qualities, which enable it to relieve and finally cure a galled spot while the animal is constantly employed.

While possessing the desirable qualities named, experience has shown, however, that the lead soon becomes crystalline in its structure, has a rough surface, and soon crumbles away, and, further, does not possess sufficient rigidity to enable it to maintain a proper shape—the latter difficulty resulting in an unequal pressure at different points of the pad.

To obviate these difficulties is the design of my invention, which consists, as a new article of manufacture, in a harness-pad composed of an iron body plated with lead, substantially as and for the purpose hereinafter specified.

As my invention is equally applicable to any form of pad employed upon or in connection with a harness, it will be a sufficient illustration to show its application to one form of pad, which, for convenience, is such as is used beneath a collar.

In the annexed drawing, A represents a collar-pad, constructed of or from iron, and having such form as will enable it to fit easily upon a horse's neck and properly sustain the pressure of the collar.

The pad shown may, if desired, be formed of cast metal, but I prefer to construct it from thin sheet metal; but in either case it afterward is covered with a coating of lead, which is preferably deposited by means of a galvano-electric battery. The pad, thus constructed and coated, is finally covered upon its upper side with leather, and used in the ordinary manner; and, while found to possess all the healing qualities of the sheet-lead pads, is sufficiently rigid to cause it to maintain its proper shape, and has a bearing-surface which is durable and cannot become rough.

While possessing the merits named, my pad can be furnished at a lower rate than those constructed wholly from lead.

Having thus fully set forth the nature and merits of my invention, what I claim is—

As a new article of manufacture, a harness-pad composed of an iron body plated with lead, substantially as and for the purpose specified.

In testimony that I claim the foregoing I have hereunto set my hand this 14th day of July, 1874.

GEORGE W. VOSBURGH.

Witnesses:
J. F. ELLIS,
ABEL DAVIS.